Dec. 25, 1962  L. C. BEARER  3,069,844
IGNITION OF SOLID ROCKET PROPELLANTS
Filed June 2, 1958  2 Sheets-Sheet 1
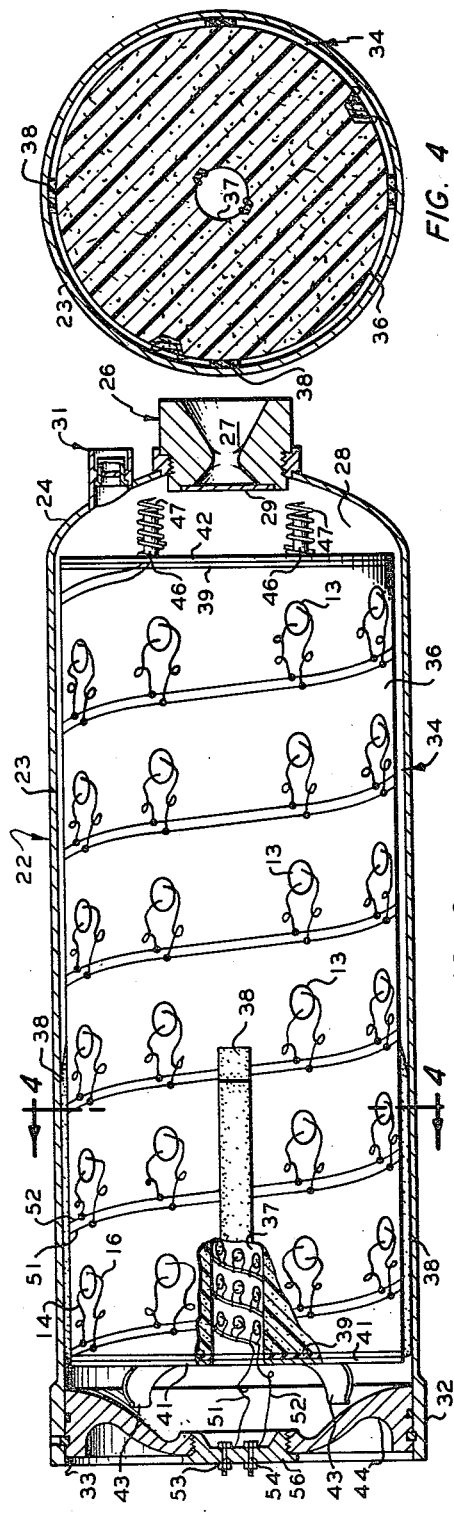
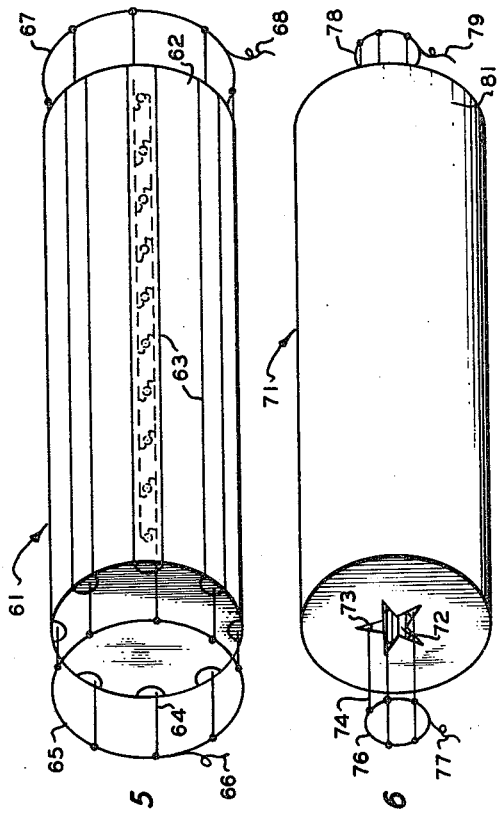
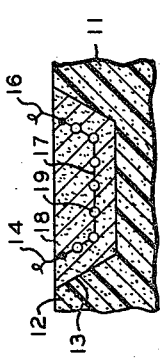
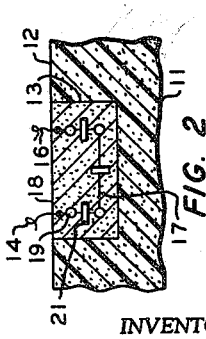
INVENTOR.
L.C. BEARER
BY Hudson & Young
ATTORNEYS Dec. 25, 1962 L. C. BEARER 3,069,844
IGNITION OF SOLID ROCKET PROPELLANTS
Filed June 2, 1958 2 Sheets-Sheet 2

INVENTOR.
L. C. BEARER

BY Hudson & Young

ATTORNEYS

United States Patent Office 3,069,844
Patented Dec. 25, 1962

3,069,844
IGNITION OF SOLID ROCKET PROPELLANTS
Louis C. Bearer, Waco, Tex., assignor to Phillips Petroleum Company, a corporation of Delaware
Filed June 2, 1958, Ser. No. 739,439
18 Claims. (Cl. 60—35.6)

This invention relates to the ignition of solid rocket propellants. In one aspect it relates to improved means for igniting solid rocket propellants, such as those propellants loaded in rocket motors employed to assist the takeoff of aircraft, or those rocket motors employed for booster or sustainer service. In another aspect, it relates to such rocket mtors loaded with propellant charges having novel ignition means associated therewith.

Solid rocket propellants, such as that type with which this invention is particularly concerned, comprise a major amount of a solid inorganic oxidant and a minor amount of a binder which serves as a fuel. Ammonium nitrate and ammonium perchlorate are often utilized as oxidants while the fuel or binder component is usually a hydrocarbon material which bonds the oxidant particles into a solid grain. Binder-fuel materials commonly employed include asphalt, rubber, and other tacky, hydrocarbon-containing materials. Recently, superior solid propellant materials of the composite type have been discovered which comprise a major proportion of a solid oxidant, such as ammonium nitrate or ammonium perchlorate, and a minor amount of a rubbery binder material, such as copolymers of a conjugated diene and a vinylpyridine or other substituted heterocyclic nitrogen-base compound. Solid propellant materials of this type are disclosed and claimed in copending applications Serial No. 284,447, filed April 25, 1952, now Patent Number 3,003,861 and Serial No. 561,943, filed January 27, 1956, by W. B. Reynolds and J. E. Pritchard.

The aforementioned propellant mixtures are inherently difficult to ignite, especially where ammonium nitrate is utilized as the oxidant. Ammonium nitrate-binder composite solid propellants have a relatively high auto-ignition temperature (e.g., 600° F.) and while their specific heats are relatively high, their heat transfer coefficients are low. Many of these propellants are fabricated in the form of rather complex configurations with large burning surfaces, portions of which are often relatively remote from the igniter. Moreover, the ignitability of these propellants often varies due to condensation of moisture, variations in propellant surfaces due to extrusion phenomenon, curing, etc. As a result, it is often difficult to instantaneously and completely ignite the burning surfaces of these propellants in a reproducible manner, especially throughout a wide range of temperature conditions. Incomplete or poor ignition of a propellant is evidenced by a relatively long period of ignition lag or delay, often resulting in a misfire or hangfire.

Prior art igniters such as cloth bags, plastic cups, or other containers filled with powdered igniter charges, such as black powder, have been found wanting in certain respects, especially where portions of the exposed propellant burning surface are remotely located in respect to the location of the igniter, these remote portions being hereinafter referred to as relatively inaccessible burning surfaces. These igniters require a comparatively large quantity of ignition material with the result that when the latter is ignited an explosion-type combustion often takes place and the shock or brisance produced may cause some disintegration of the solid propellant and consequently set up excessively high pressures within the rocket motor combustion chamber. The ignition products from these igniters are often scattered at random in the rocket motor combustion chamber and as a result all points of the propellant burning surface are not simultaneously and instantaneously ignited, especially the relatively inaccessible burning surfaces. Where these igniter charges are employed to initiate the combustion of axially perforated propellant grains, the ignition products tend to be directed through the perforation, thus minimizing the propagation of the igniter flash over all of the propellant surface desired to be ignited. Moreover, these powdered igniter charges are often subject to impact shock and static electricity; as a result the combustion of propellants ignited by these igniter charges is often non-uniform, thereby affecting the safe operation of the rocket motor and affecting the thrust or ballistic characteristics thereof.

Accordingly, an object of this invention is to improve the ignition of solid rocket propellants. Another object is to provide improved ignition means for igniting solid rocket propellants, such as those propellants loaded in rocket motors employed to assist the take-off of aircraft, and rocket motors employed for booster or sustainer service. Another object is to provide a novel propellant charge having improved ignition means associated therewith. Another object is to instantaneously and uniformly ignite the entire exposed burning surface of a grain of solid propellant, especially normally inaccessible burning surfaces. Another object is to provide a rocket motor loaded with a solid propellant charge and provided with novel ignition means. A further object is to ignite solid rocket propellant in a safe, reliable, reproducible, and inexpensive manner. Other objects and advantages of this invention will become apparent to those skilled in the art from the following discussion, appended claims, and drawing in which:

FIGURE 1 is a cross-sectional view of a portion of a solid propellant, the exposed burning surface of which is provided with the novel ignition means of this invention;

FIGURE 2 is a view similar to that of FIGURE 1 illustrating a further embodiment of this invention;

FIGURE 3 is a side elevational view, in partial section, of a rocket motor loaded with a grain of solid propellant provided with the novel ignition means of this invention;

FIGURE 4 is a cross-sectional view of FIGURE 3 taken along the plane indicated;

FIGURE 5 is an isometric view of a grain of solid propellant illustrating a further embodiment of this invention;

FIGURES 6, 7 and 8 are other isometric views of grains of solid propellant illustrating other embodiments of this invention;

Figure 9:
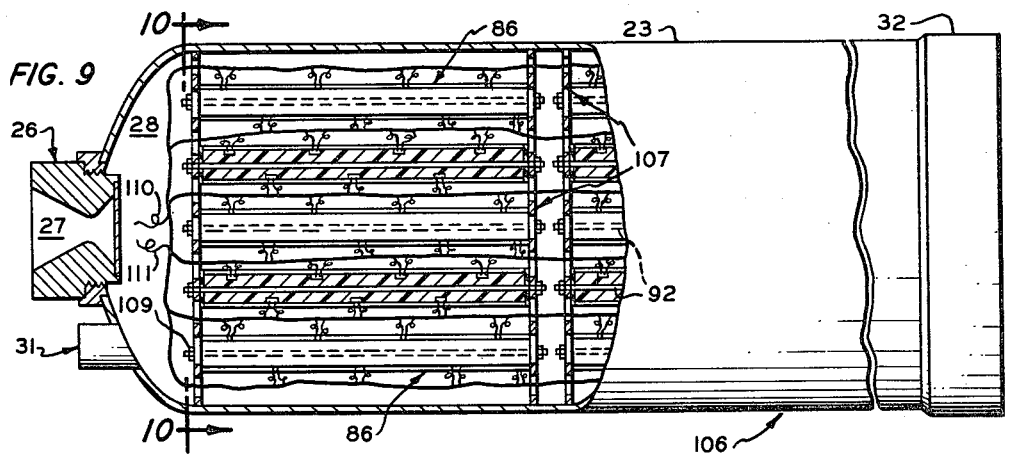
FIGURE 9 is a side elevational view, in partial section, of another rocket motor loaded with a plurality of grains of solid propellant illustrating a further embodiment of this invention.

Referring now to the drawing, wherein like characters refer to similar parts, and to FIGURE 1 in particular, a portion 11 of a solid grain of propellant is illustrated having an exposed burning surface 12. Burning surface 12 is provided with a depression 13, which can be in the form of a cavity, groove, or the like. Suitable electrically conducting lead wires 14, 16 are operatively connected to a small length of electrical resistance wire 17, made, for example, of Nichrome, which depends in depression 13 and is embedded in castable, high energy propellant 18 that fills the depression 13. Affixed to resistance wires 17 are a plurality of regularly spaced pellets 19 of pyrotechnic material which are also embedded in the castable propellant 18.

In FIGURE 2, a modification of that shown in FIGURE 1 is illustrated. In addition to the regularly spaced pyrotechnic pellets 19, a plurality of alternately spaced disks or washers 21 of high energy propellant similar to that propellant 18 filling the depression 13 are affixed to resistance wire 17.

Referring now to FIGURES 3 and 4, a rocket motor generally designated 22 is shown and represents one form of a jet propulsion device which may be employed, for example, to assist the take-off of an aircraft, this type of rocket motor generally being known as a JATO unit. Rocket motor 22 has a cylindrical metal casing 23 having a reduced rear or aft portion 24 which defines an axial opening in which a nozzle device generally designated 26 is provided. Nozzle 26 is of the DeLaval type provided with a converging-diverging passage 27 for the passage of combustion gases from a combustion chamber 28 defined by the casing 23. A blowout or starter disk 29 can be provided across the mouth of nozzle passage 27 and is adapted to rupture or otherwise displace when the compression within the combustion chamber 28 reaches a predetermined bursting pressure, for example, 200–600 p.s.i. The reduced casing portion 24 can have one or more safety plug attachments generally designated 31 therein capable of releasing excessive pressure from the combustion chamber 28, in a manner well known to those skilled in the art. The other or head end of casing 23 can be in the form of an enlarged portion 32 and this end of the casing can be closed by means of closure member 33 which is securely fastened to casing portion 32 by means of threads, keys, or the like.

A grain of solid rocket propellant generally designated 34 is loaded in the combustion chamber 28 of the rocket motor 22. This particular grain 34 is cylindrical in shape and has an outer diameter somewhat smaller than the inner diameter of casing 23. Grain 34 is of the internal-external burning type by reason of its exposed or unrestricted outer surface 36 and its inner surface 37, the latter surface defining an axial perforation extending the length of the grain. Grain 34 can be suspended and supported within combustion chamber 28 by any suitable means; for example, a plurality of retaining pads or strips 38, made of sponge rubber, for example, are placed between the head portion of the external burning surface 36 and the adjacent head portion of casing 23. The ends of grain 34 are restricted by means of layers of restricting material 39 having central openings in alignment with the axial perforation of grain 34. Retaining plates 41 and 42 are secured to layers of restricting material 39 and the former also are provided with similar axial openings. Secured to the head retaining plate 41 are outer-extending prongs or legs 43 which are adapted to register with a grain retaining assembly 44 that is suitably secured to casing portion 32 after the grain 34 is loaded in combustion chamber 28. The aft retaining plate 42 has a plurality of prongs 46 secured to its outer surface, the prongs being surrounded by compression springs 47 which are adapted to come into contact with the reduced casing portion 24.

Both the exposed outer burning surface 36 and the exposed inner burning surface 37 of grain 34 are provided with a plurality of regularly spaced depressions 13, such as that illustrated in FIGURES 1 and 2. As mentioned hereinbefore, these depressions 13 are filled with a castable, high energy propellant in which is embedded a high resistance wire with a plurality of regularly spaced pyrotechnic pellets and washers of high energy propellant. The electrically conducting wires 14, 16 of each of the depressions are operatively connected to electrical conducting wires 51, 52. The latter wires can be spirally wound around the outer surfaces 36 of the grain 34 and then spirally wound within the axial perforation of the grain. The ends of wires 51, 52 are connected to electrically insulated bolts or binding posts 53, 54 connected to an igniter plug 56 suitably secured to the grain retaining assembly 44. Bolts 53, 54 can be suitably insulated and connected to an external power source, such as a battery or the like, when it is desired to arm the rocket motor and ready it for firing. It should be understood that the resistance wires in each of the depressions in the burning surfaces can be electrically connected in any other suitable manner other than that shown in the drawing.

In FIGURE 5, wherein another embodiment of this invention is illustrated, a cylindrical grain 61 of solid propellant has an outer or external burning surface 62. The latter surface is provided with a plurality of longitudinally aligned depressions in the form of grooves 63. The grooves 63, like the depression 13 of FIGURES 1 and 2, are filled with high energy propellant. Resistance wires 64 pass through the length of each groove 63 and there are affixed to these wires a plurality of pyrotechnic pellets like that hereinbefore described; in addition, a plurality of the aforementioned disks or washers of high energy propellant can also be affixed to these resistance wires. Grain 61 is of the external burning type and can have its ends covered with the aforementioned restricting material. Alternatively, grain 61 can also have an axial perforation defined by an inner exposed burning surface which can be similarly provided with a plurality of grooves 63. The head ends of the resistance wires 64 can be operatively connected to a loop 65 of electrically conducting wire having a lead 66 leading to an external power source. The aft ends of resistance wires 64 can also be connected to a loop 67 of electrically conducting wire having a lead 68 that is also connected to the external power source.

In FIGURE 6, another grain 71 is illustrated. Grain 71 has an internal burning surface 72 defined by a perforation in the form of a star. The outer points of the stars are in effect depressions in the internal burning surface 72 and these depressions are filled with the aforementioned high energy propellant 73. The filled star points have embedded therein a resistance wire 74, similar to 64 of FIGURE 5, this wire also being provided with a plurality of pyrotechnic pellets. The head ends of the resistance wires 74 are operatively connected to a loop 76 or electrically conducting wire provided with a lead 77 which can be connected to an external power source. The aft ends of resistance wires 74 are similarly connected to a loop 78 of electrically conducting wire having a similar lead wire 79 that is adapted to be connected to the external power source. The external surface 81 of grain 71 can be covered with the aforementioned burning restricting material, or alternatively, it can be exposed to form an external burning surface, which surface can also be provided with the grooves 63 illustrated in FIGURE 5. It is also to be understood that the grooves 63 and 73 of FIGURES 5 and 6 can be spirally or otherwise oriented over the burning surface of the grain, and the resistance wires in these grooves can be operatively connected to the power source by any suitable arrangement other than that shown.

Figure 7:
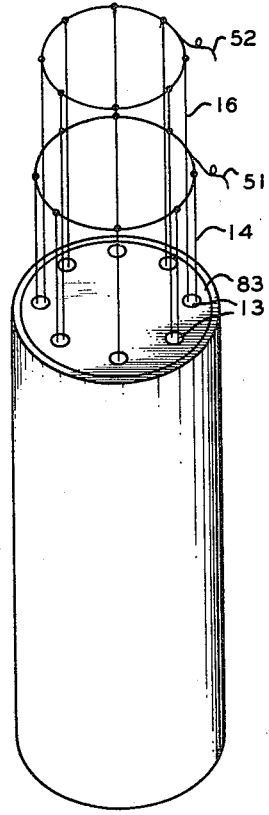

In FIGURE 7, an end burning grain 82 is shown, the outer cylindrical surface and one end thereof being restricted with the other end exposed to form a burning surface 83. Regularly spaced over the latter surface are a plurality of depressions 13 in which are embedded resistance wires having pyrotechnic pellets affixed thereto, the resistance wires connected to loops 14, 16 of electrically conducting wires.

The grains of FIGURES 5, 6 and 7 can be loaded in a rocket motor, such as that illustrated in FIGURE 3, but to avoid prolixity such rocket motors are not illustrated.

Figure 8:
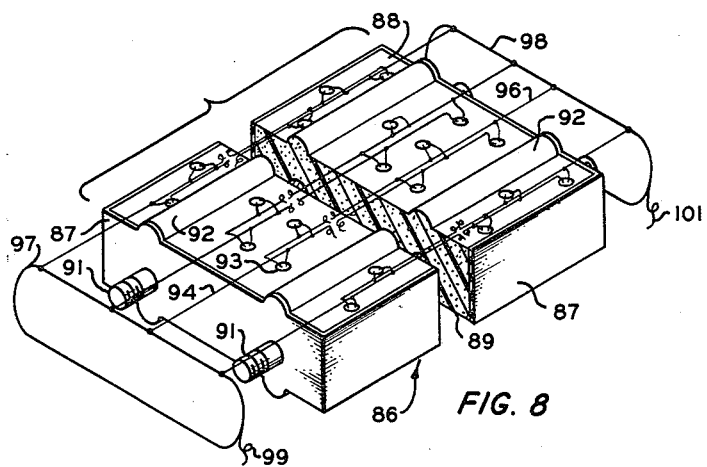

Referring now to FIGURE 8, a solid propellant grain 86 is shown and is in some respects similar to that disclosed and claimed in the copending application, Serial No. 453,772, filed September 2, 1954, by B. R. Adelman, now Patent Number 2,939,396. Grain 86 has a rectangular parallelepiped configuration with its sides and ends covered by burning restricting material 87, while its upper surface 88 and lower surface 89 are exposed or unrestricted to permit burning of the propellant material. Grain 86 is shown provided with longitudinal internal support members or rods 91 (preferably made of metal) which protrude from the ends of the grain, these protruding ends being provided with suitable threads. The upper and lower burning surfaces 88, 89 are preferably provided with ribs 92 which are likewise unrestricted and form part of said upper and lower burning surfaces. The total surface area of ribs 92 can be equal to or slightly greater than the surface area of the perforations in the propellant material provided for support rods 91. (When other means of support are used, the ribs 92 can be omitted.) This type of rocket grain, because of its two external burning surfaces can be called an external burning grain of the double-web type.

The upper and lower surfaces 88, 89 of grain 86 are provided with a plurality of regularly spaced depressions or cavities 93, similar to that hereinbefore described. The resistance wires embedded in the high energy propellant filling the depressions 93 can be operatively connected by any suitable arrangement to an electrical power source. For example, these resistance wires can be connected to electrically conducting wires 94, 96 which are in turn connected to loops 97, 98, respectively, the latter being operatively connected to a suitable power source by means of lead wires 99, 101. Alternatively, the external burning surfaces of grain 86 can be provided with grooves similar to that shown in FIGURES 5 and 6.

Figure 10:
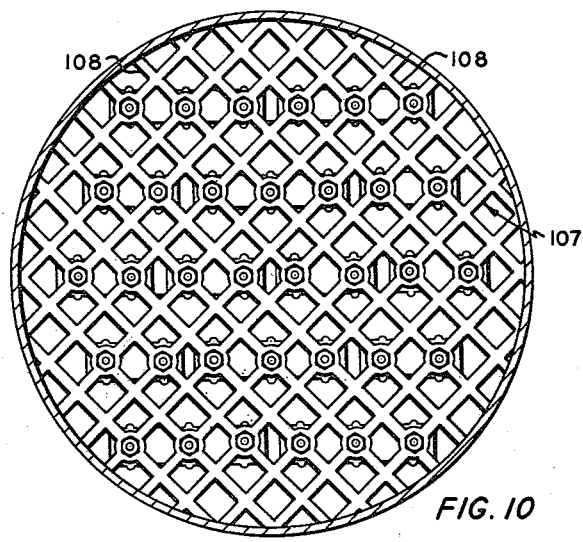
FIGURE 10 is a cross-sectional view of FIGURE 8 taken along the plane indicated.

Referring now to FIGURES 9 and 10, a rocket motor generally designated 106 is illustrated which in some respects is similar to that illustrated in FIGURE 3. The combustion chamber 28 of rocket motor 106 is loaded with a plurality of these grains 86 illustrated in FIGURE 8. The grains 86 are mounted in the combusion chamber 28 in longitudinally spaced relationship. One or more banks or charge units can be positioned in a tandem manner in the combustion chamber, each bank comprising a plurality of grains 86, the support rods of which pass through suitable frame members 107 defining each end of each unit. These frame members 107 are more clearly shown in FIGURE 10 and comprise a plurality of intersecting bars 108 arranged in the form of a lattice, the protruding ends of the support rods 92 passing through openings formed at the intersections of these bars 108. Suitable nuts or other similar means are connected to the threaded ends of the support rods. The electrically conducting wires connected to the resistance wires in each of the depressions in the external burning surfaces of the grains can be suitably connected and arranged in any suitable manner and the terminal ends 110, 111 of these electrically conducting wires can be connected to a suitable power source external to the rocket motor 106.

In the operation of the rocket motors described and illustrated in the drawings, upon closing a suitable switch in the electrical power, electrical energy is supplied to the electrically conducting wires and then to the resistance wires embedded in the high energy propellants filling the depressions or grooves in the burning surfaces of the grains. The incandescent resistance wires cause the ignition of the pyrotechnic pellets and discs affixed thereto and the resulting ignition of the pyrotechnic material instantaneously and simultaneously ignites the high energy propellant filling the depressions. Consequently, the resulting generated hot igniter combustion products instantaneously and uniformly ignite the entire burning surfaces of the grains. The resulting combustion product resulting from the burning of the propellant material of the grains proceeds to raise the pressure within the rocket motor combustion chamber to a bursting pressure, at which point in the operation the starter disk covering the nozzle passages ruptures or otherwise fails and thereby allows the propellant combustion products to escape through the nozzle at a high velocity, thereby imparting thrust to the rocket motor.

The advantages of igniting the burning surface of grains of solid propellant in accordance with this invention are believed evident. The ignition of the propellant burning surfaces is not dependent upon a remotely located igniter charge since the ignition means of this invention are located in close proximity to the entire burning surfaces of the grain. Furthermore, the normally inaccessible burning surfaces are absent and the ignition of these surfaces is insured notwithstanding the complex geometry of the propellant charge. A relatively small amount of igniter material is necessary to completely envelop the burning surfaces of the grain with an igniting flame and as a result the grain can be ignited with a minimum igniter shock or brisance.

Any type of wire having a high resistance volume, such as Nichrome and Chromel, can be employed to supply heat to the pyrotechnic material and high energy propellant filling the depressions in the grain's burning surface. The type and size of wire will generally be dependent upon the available voltage, the melting point and other physical properties of the wire. The resistance wires can be connected in parallel or series, or a conjunction of both. Those skilled in the art will be readily able to determine which designs or arrangements are to be employed upon being acquainted with this invention.

The pyrotechnic pellets and discs are relatively small, e.g., $\frac{1}{16}''$ to $\frac{1}{8}''$, and can be affixed to the resistance wire by any suitable method, e.g., by stringing, or dusting particulate pyrotechnic on very small discs or spheres on wire coated with castable propellant. After placing these wires in the perforations, the castable propellant can be poured in the depressions so as to embed the wires, and the propellant grain can then be cured.

The pyrotechnic material employed to fabricate the pellets that are affixed to the resistance wires comprises (1) powdered metal, (2) powdered inorganic oxidizing material, and (3) a binding agent like ethyl cellulose. Table I sets forth a general recipe for this type of pyrotechnic material and Table II sets forth specific compositions thereof.

*Table I*

| Igniter ingredients | Parts by weight | Weight percent |
|---|---|---|
| Pyrotechnic components | | 98-85 |
| Potassium perchlorate | 0-63 | |
| Barium nitrate | 0-70 | |
| Zirconium dichromate | 0-58 | |
| Zirconium-nickel alloy | 0-80 | |
| Aluminum | 0-33 | |
| Magnesium | 0-47 | |
| Titanium | 0-65 | |
| Zirconium hydride | 0-2 | |
| Boron | 0-9 | |
| Supplemental pressure components | | 0-5 |
| Black powder | 0-3 | |
| Tetranitrocarbazole | 0-5 | |
| Binding agent: ethylcellulose | 0-5 | 2-15 |

*Table II*

| Ingredient | Formulation A, wt. percent | Formulation B, wt. percent | Formulation C, wt. percent |
|---|---|---|---|
| Potassium perchlorate | 50 | 26.5 | 62.5 |
| Barium nitrate | 15 | 16.6 | |
| Zirconium-nickel alloy | 32 | 53.9 | 12.5 |
| Ethylcellulose | 3 | 3.0 | 3.0 |
| Aluminum | | | 12.5 |
| Calcium stearate | | | 0.8 |
| Boron | | | 8.7 |

The high energy propellant employed to fill the depressions or cavities in the grain's burning surface comprises (1) a solid oxidant, such as the ammonium, alkali metal and alkaline earth metal salts of nitric, perchloric, and chloric acids, (2) a rubbery polymer as a binder and (3) finely divided or powdered metal, such as aluminum, magnesium or titanium. Suitable oxidants which can be used in fabricating these high energy propellants include ammonium nitrate, ammonium perchlorate, sodium nitrate, barium nitrate, lithium chlorate, potassium chlorate, sodium perchlorate, and the like, including mixtures thereof. Useful rubbery polymers which can be used as the binder include polysulfide liquid polymers, such as those prepared by the Thiokol Chemical Company, Trenton, New Jersey, and designated LP-2, LP-3, LP-8, LP-32, and LP-33. Other applicable rubbery polymers include those disclosed in the aforementioned copending applications, Serial No. 284,447 and Serial No. 561,943, such as a copolymer of a conjugated diene and a heterocyclic nitrogen base compound (e.g., 1,3-butadiene/2-methyl-5-vinylpyridine). Other useful rubbery polymers include GR-S rubber, neoprene, and the like. The polysulfide polymers are preferred because they can be readily molded and cured at low temperatures. Various other compounding ingredients can be incorporated into the high energy propellant to stabilize combustion and increase the burning rate, e.g., $Fe_2O_3$, copper chromite, ammonium dichromate, Milori blue, and other compounds normally used as burning rate modifiers or catalysts. Suitable smoke depressants, e.g., MgO, can also be incorporated. Plasticizers can also be incorporated, e.g., Philrich 5 (a highly aromatic oil), Sundex 53 (aromatic product derived from petroleum), Chlorowax 40 (liquid chlorinated paraffins), Califlux TT (naphthenic hydrocarbon, predominantly unsaturated) TP-90B (dibutoxyethoxyethyl formal), ZP-211 (same as TP-90B except that it is topped to remove low boiling materials), and the like. Various curing agents can be added, e.g., sulfur, GMF (p-quinone dioxine), etc., as well as curing accelerators, e.g., DPG (diphenyl guanidine), Philcure 113 (SA-113 N,N-dimethyl-S-tertiary butylsulfenyl dithiocarbamate), Butyl 8 (a dithiocarbamate-type rubber cure accelerator), and the like. Various fillers can also be incorporated such as various carbon blacks sold under trade names like Thermax, P-33, Philblack A, Kosmos 20, Pelletex, and Sterling LL. In general, the binders employed in fabricating the high energy propellants of this invention will have compositions such as that set forth in Table III.

*Table III*

| Binder ingredient | Parts per 100 parts rubber |
| --- | --- |
| Rubber (LP-3) | 100 |
| Curing agent: | |
| (GMF) | 6-8 |
| (S) | 0.25-2.50 |
| Curing accelerator (DPG) | 2.5-3.5 |
| Smoke depressant (MgO) | 0.5-2.0 |
| Plasticizer (ZP-211) | 0-15 |
| Filler (Thermax) | 5-25 |
| Burning rate catalyst ($Fe_2O_3$) | 0-7.8 |

Particularly useful high energy propellants have the formulations or compositions set forth in Table IV.

*Table IV*

| | Formulation | | | |
| --- | --- | --- | --- | --- |
| | I | II | III | IV |
| Ingredient [1]: | | | | |
| LP-3 | 100 | 100 | 100 | 100 |
| GMF | 7 | 7 | 7 | 7 |
| DPG | 3 | 3 | 3 | 3 |
| S | 2 | 0.5 | 2 | 3 |
| MgO | 1 | 1 | 1 | 1 |
| ZP-211 | 5 | 5 | 5 | 5 |
| Thermax | 20 | 10 | 20 | 20 |
| $Fe_2O_3$ | 1 | 1.5 | 1 | |
| Al | 10 | 33 | 10 | 10 |
| $NH_4ClO_4$ | 50 | | 100 | 100 |
| $KClO_4$ | | 301 | | |
| Burning rate [2] (est.) | 0.4 | 0.75 | | 0.6 |

[1] Parts per 100 parts rubber.
[2] In./sec. at 500 p.s.i. -75° F.

The solid propellants which can be ignited with the novel ignition means of this invention include any of those known being fabricated, e.g., duel or composite base, mono-base, etc. The composite base propellants disclosed and claimed in said copending applications Serial No. 284,447, now Patent Number 3,003,861 and Serial No. 561,943 by W. B. Reynolds et al. are preferred. These preferred composite propellants are of the rubber copolymer-oxidant type which is plasticized and worked to prepare an extrudable mass at 130° to 175° F. The copolymer can be reinforced with suitable reinforcing agents such as carbon black, silica, and the like. Suitable oxidation inhibitors, wetting agents, modifiers, vulcanizing agents, and accelerators can be added to aid processing and to provide for the curing of the extruded grains of propellant at temperatures preferably in the range of 170° to 185° F. In addition to the copolymer binder and other ingredients, the propellant composition comprises an oxidant and a burning rate catalyst.

The copolymers are preferably formed by copolymerization of a vinyl heterocyclic nitrogen compound with an open chain conjugated diene. The conjugated dienes preferably employed are those containing 4 to 6 carbon atoms per molecule and representatively include 1,3-butadiene, isoprene, 2,3-dimethyl-1,3-butadiene, and the like. The vinyl heterocyclic nitrogen compound generally preferred is a monovinylpyridine or alkyl-substituted monovinyl-pyridine such as 2-vinylpyridine, 3-vinylpyridine, 4-vinylpyridine, 2-methyl-5-vinylpyridine, 5-ethyl-2-vinylpyridine, 2,4-dimethyl-6-vinylpyridine, and the like. The corresponding compounds in which an alpha-methylvinyl (isopropenyl) group replaces the vinyl group are also applicable.

In the preparation of the copolymers, the amount of conjugated diene employed can be in the range between 75 and 95 parts by weight per 100 parts monomers and the vinyl heterocyclic nitrogen can be in the range between 25 and 5 parts. Terpolymers are applicable as well as copolymers and in the preparation of the former up to 50 weight percent of the conjugated diene can be replaced with another polymerizable compound such as styrene, acrylonitrile, and the like. Instead of employing a single conjugated diene compound, a mixture of conjugated dienes can be employed. The preferred, readily available binder employed is a copolymer prepared from 90 parts by weight of butadiene and 10 parts by weight of 2-methyl-5-vinylpyridine, hereinafter abbreviated Bd/MVP. This copolymer is polymerized to a Mooney (ML-4) plasticity value in the range of 10-40, preferably in the range of 15 to 25, and may be masterbatched with 5-20 parts of Philblack A, a furnace black, per 100 parts of rubber.

The following empirical formulation or recipe generally represents the class of propellant compositions preferred for the preparation of the grains of propellant of this invention:

*Table V*

| Ingredient | Parts per 100 parts of rubber | Parts by weight |
| --- | --- | --- |
| Binder | | 10-25 |
| Copolymer (Bd/MVP) | 100 | |
| Philblack A (a furnace black) | 10-30 | |
| Plasticizer | 10-30 | |
| Silica | 0-20 | |
| Metal oxide | 0-5 | |
| Antioxidant | 0-5 | |
| Wetting agent | 0-2 | |
| Accelerator | 0-2 | |
| Sulfur | 0-2 | |
| Oxidant (ammonium nitrate) | | 75-90 |
| Burning rate catalyst | | 0-30 |

Suitable plasticizers useful in preparing these grains of propellant include TP-90-B; benzophenone; and Pentaryl A (monoamylbiphenyl). Suitable silica preparations include a 10-20 micron size range supplied by Davison Chemical Company; and Hi-Sil 202, a rubber grade material supplied by Columbia-Southern Chemical Corporation. A suitable anti-oxidant is Flexamine, a physical mixture containing 25 percent of a complex diarylamine-ketone reaction product and 35 percent of N,N' - diphenyl - p - phenylenediamine. A suitable wetting agent is Aerosol–OT (dioctyl sodium sulfosuccinate). Satisfactory rubber cure accelerators include Philcure 113; Butyl–8; and GMF. Suitable metal oxides include zinc oxide, magnesium oxide, iron oxide, chromium oxide, or combination of these metal oxides. Suitable burning rate catalysts include ferrocyanides sold under various trade names such as Prussian blue, steel blue, bronze blue, Milori blue, Turnbull's blue, Chinese blue, new blue, Antwerp blue, mineral blue, Paris blue, Berlin blue, Erlanger blue, foxglove blue, Hamburg blue, laundry blue, washing blue, Williamson blue, and the like. Other burning rate catalysts such as ammonium dichromate, potassium dichromate, sodium dichromate, ammonium molybdate, and the like, can also be used.

The layer of restricting material can be made from any of the slow burning materials used for this purpose in the art, such as cellulose acetate, ethylcellulose, butadiene-methylvinylpyridine copolymer, GR–S, natural rubber, and the like.

Various modifications and alterations of this invention will become apparent to those skilled in the art without departing from the spirit and scope of this invention and it is to be understood that the foregoing discussion and drawing merely represent preferred and illustrative embodiments of this invention and do not unduly limit the same.

I claim:

1. In a rocket motor comprising a casing defining a combustion chamber and having a reaction nozzle communicating therewith, a solid propellant charge loaded in said chamber, said charge having an exposed burning surface, a plurality of depressions formed in said burning surface, a resistance wire depending within each of said depressions, a plurality of regularly spaced pellets of pyrotechnic material affixed to each of said resistance wires, castable propellant material filling said depressions and embedding said resistance wires and pellets, and means to supply said resistance wires with electrical energy.

2. In a rocket motor comprising a casing defining a cylindrical combustion chamber and having a reaction nozzle of the DeLaval type communicating therewith, a charge of solid propellant loaded in said chamber, said propellant comprising a major amount of an inorganic oxidant and a minor amount of rubbery binder, said charge having an exposed burning surface, a plurality of regularly spaced depressions formed in said burning surface, a resistance wire depending within each of said depressions, a plurality of regularly spaced pellets of pyrotechnic material affixed to each of said resistance wires, said pyrotechnic material comprising powdered metal, powdered inorganic oxidizing material, and a binding agent, castable propellant filling said depressions and embedding said resistance wires and pellets, said castable propellant comprising an inorganic oxidant, a rubber binder, and powdered metal, and means to supply said resistance wires with electrical energy.

3. In a rocket motor according to claim 2 wherein said propellant comprising said charge comprises a major amount of an inorganic oxidant selected from the group of salts consisting of nitrates, chlorates, and perchlorates of ammonia, alkali metals, and alkaline earth metals, and a minor amount of a rubbery copolymer of 1,3-butadiene and 2-methyl-5-vinylpyridine.

4. In a rocket motor according to claim 3 wherein said pyrotechnic material comprises potassium perchlorate, aluminum, an alloy of zirconium and nickel, and ethylcellulose, and wherein said castable propellant comprises ammonium perchlorate, a polysulfide liquid polymer, and aluminum.

5. In a rocket motor according to claim 4 wherein said propellant charge comprises a plurality of suspended grains having a parallelepiped configuration with upper and lower surfaces exposed to serve as said burning surface.

6. In a rocket motor according to claim 4 wherein said propellant charge is a cylindrical grain having its outer cylindrical surface serving as said burning surface.

7. In a rocket motor according to claim 6 wherein said depressions are cavities and said means comprises electrically conducting wires helically wound around said grain and operatively connected to said resistance wires.

8. In a rocket motor according to claim 6 wherein said grain has an axial perforation defined by a surface which also functions as a portion of said burning surface.

9. In a rocket motor according to claim 8 wherein said perforation is in the shape of a star, the outer points of which constitute said depressions.

10. A grain of solid propellant, said grain having an exposed burning surface, a plurality of depressions formed in said burning surface, a resistance wire depending within each of said depressions, a plurality of regularly spaced pellets of pyrotechnic material affixed to each of said resistance wires, and castable propellant material filling said depressions and embedding said resistance wires and pellets.

11. A grain of solid propellant comprising a major amount of an inorganic oxidant and a minor amount of a rubbery binder, said grain having an exposed burning surface, a plurality of regularly spaced depressions formed in said burning surface, a resistance wire depending within each of said depressions, a plurality of regularly spaced pellets of pyrotechnic material affixed to each of said resistance wires, said pyrotechnic material comprising powdered metal, powdered inorganic oxidizing material, and a binding agent, and castable propellant filling said depressions and embedding said resistance wires and pellets, said castable propellant comprising an inorganic oxidant, a rubbery binder, and powdered metal.

12. A grain according to claim 11 wherein said propellant comprising said grain comprises a major amount of an inorganic oxidant selected from the group of salts consisting of nitrates, chlorates, and perchlorates of ammonia, alkali metals, and alkaline earth metals, and a minor amount of a rubbery copolymer of 1,3-butadiene and 2-methyl-5-vinylpyridine.

13. A grain according to claim 11 wherein said pyrotechnic material comprises potassium perchlorate, aluminum, an alloy of zirconium and nickel, and ethylcellulose, and wherein said castable propellant comprises ammonium perchlorate, a polysulfide liquid polymer, and aluminum.

14. A grain according to claim 10 wherein said grain has a parallelepiped configuration with upper and lower surfaces exposed to serve as said burning surface.

15. A grain according to claim 10 wherein said grain is cylindrical and has its outer cylindrical surface serving as said burning surface.

16. A grain according to claim 15 wherein said depressions are cavities and said resistance wires are operatively connected to electrically conducting wires helically wound around said grain.

17. A grain according to claim 15 wherein said grain has an axial perforation defined by a surface which also functions as a portion of said burning surface.

18. A grain according to claim 17 wherein the cross section of said perforation is in the shape of a star, the outer points of which constitute said depressions.

References Cited in the file of this patent

UNITED STATES PATENTS

| | | |
|---|---|---|
| 2,400,242 | Malina et al. | May 14, 1946 |
| 2,563,265 | Parsons | Aug. 7, 1951 |
| 2,816,418 | Loedding | Dec. 17, 1957 |